June 9, 1931.  W. H. WATROUS  1,809,087
BRAKE TESTING LEVER
Filed Nov. 19, 1928   2 Sheets-Sheet 1
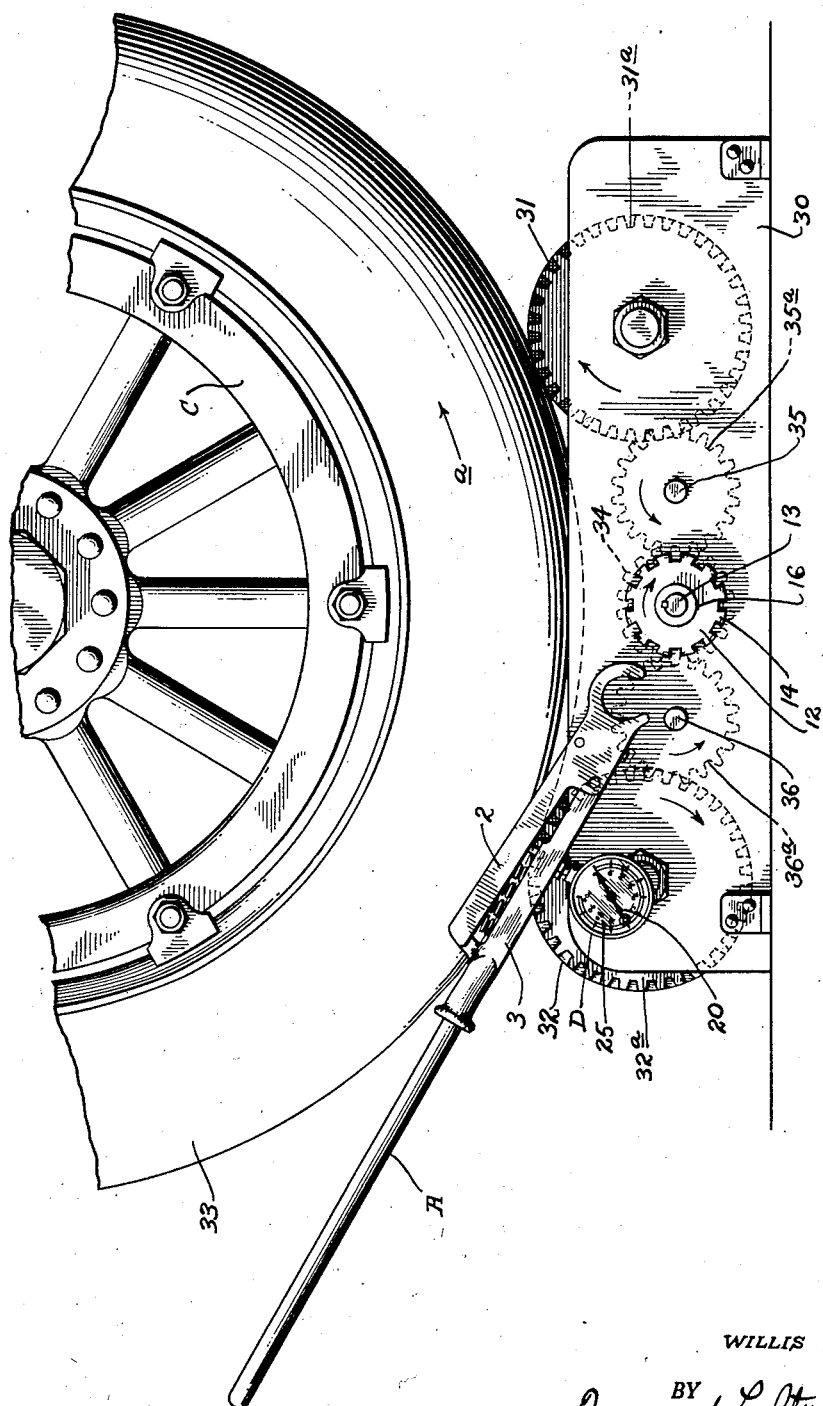
INVENTOR.
WILLIS H. WATROUS.
BY
Townsend, Loftus & Abbott
ATTORNEYS.

June 9, 1931.  W. H. WATROUS  1,809,087
BRAKE TESTING LEVER
Filed Nov. 19, 1928  2 Sheets-Sheet 2
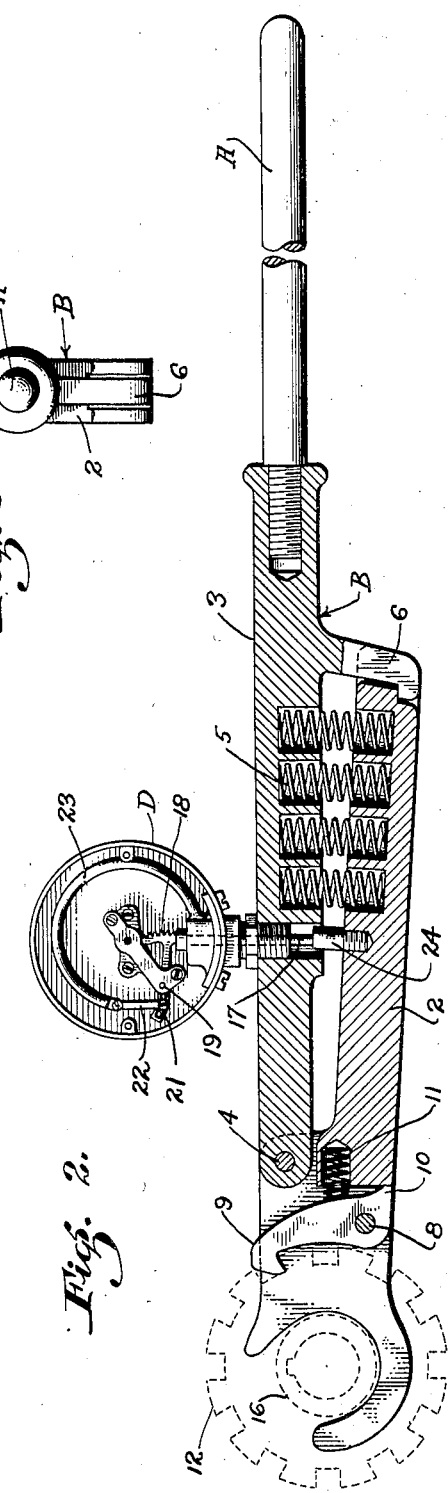
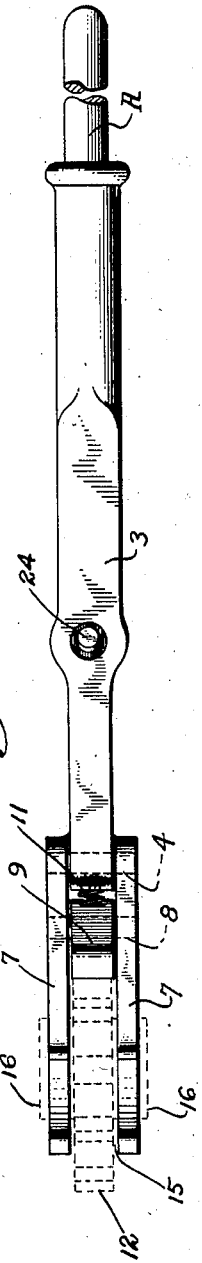
INVENTOR.
WILLIS H. WATROUS.
ATTORNEYS.

Patented June 9, 1931

1,809,087

UNITED STATES PATENT OFFICE

WILLIS H. WATROUS, OF OAKLAND, CALIFORNIA

BRAKE TESTING LEVER

Application filed November 19, 1928. Serial No. 320,296.

This invention relates to a brake testing lever, which is designed for testing the brakes of automobiles and the like, and particularly to improvements in construction on the type of brake testing lever shown in the co-pending application entitled "Method and apparatus for testing brakes" filed by H. H. Patton, April 9, 1928, Serial Number 268,398.

The type of brake testing apparatus illustrated in the above mentioned application, briefly stated, comprises four trucks, one for each wheel of the automobile to be tested. Each truck is provided with two drums, upon which the wheels rest. Means are provided whereby a predetermined pressure is applied to the brakes and means are employed for rotating the drums in unison, and in the same direction, so as to rotate the wheels against the resistance of the brakes. The last named means comprises a lever by which rotation is transmitted, and this lever carries an instrument similar to a pressure gauge so as to visibly indicate the resistance of each brake. Hence, if one brake shows more resistance than another, it may be adjusted, and the final result will be a uniform brake resistance on all wheels.

The lever just referred to is known as a brake testing lever, and is moved from one truck to another, as the testing of the several brakes proceeds. It takes time to connect and disconnect the lever, with relation to each truck, and the object of the present invention is to provide a simple attachment whereby the lever may be quickly connected or disconnected with relation to the trucks, as each brake is tested.

The improved attachment is shown by way of illustration in the accompanying drawings, in which:

Fig. 1 is a side elevation of one of the trucks, said view showing one of the automobile wheels in position on the truck and said view also showing the brake testing lever prior to connection with the truck, Fig. 2 is a central longitudinal section of the brake testing lever, Fig. 3 is an end view of the brake testing lever, Fig. 4 is a plan view of the brake testing lever, showing the indicating gauge removed.

Referring to the drawings in detail, and particularly Figs. 2 and 4, A indicates in general a handle, which is attached to the brake testing lever generally indicated at B. This lever consists of two members, indicated at 2 and 3, the two levers being pivotally connected at the point 4, and being normally separated as shown in Fig. 2 by means of a series of interspaced springs, such as indicated at 5, the distance that the levers are separated being controlled by a lug 6. The lower end of the lever member 2 is provided with a pair of interspaced hook-shaped extensions 7, 7.

Pivotally mounted, as at 8, between said extensions, is a pawl 9. Formed on the pivotal end of the pawl is a dog 10, which limits movement of the pawl in one direction, and interposed between the pawl and the lever member 2 is a helical compression spring 11, which serves the function of normally retaining the pawl in engagement with a ratchet gear, generally indicated at 12. This gear, by the way, forms a part of the brake testing mechanism, and it is keyed or otherwise secured on a shaft 13, see Fig. 1. The ratchet gear is in this instance provided with squared teeth 14, so that the brake testing lever and the pawl carried thereby may be operated either to rotate the wheel C of the automobile ahead or reverse, as the case may be. The face of the ratchet gear has a width slightly less than the spacing 15 formed between the hook-shaped extensions 7, 7 of the lever member 2, and the hook-shaped members can thus straddle the gear and engage the hubs 16 thereof, as shown in Figs. 2 and 4.

The brake testing lever is otherwise provided with an instrument in the form of a pressure gauge, such as generally indicated at D, see Fig. 2. The gauge is provided with a plunger 17, which engages a gear segment 18, pivotally mounted at the point 19. The segment engages the usual pinion, not here illustrated, and this in turn rotates a pointer or hand, such as indicated at 20, see Fig. 1.

The gear segment 18 is provided with an extension lever 21, and this is connected by means of a link 22, with a Bourdon tube 23, which in this instance merely serves as a spring. The plunger 17 of the gauge engages a pin 24 secured to the lever member 2. Hence, if pressure is applied on the lever 2, by means of the lever 3 and the handle A, pin 24 will exert pressure on the plunger 17. This will in turn swing the gear segment 18 about its pivot 19, and as such will transmit a rotary movement to the gauge pinion and the pointer 20. This will accordingly swing over the graduated dial 25 of the gauge, and the resistance to turning movement will be visibly indicated.

It was previously stated that each wheel of the automobile to be tested is placed on a truck, and that one truck is employed for each wheel. One of the trucks is illustrated in Fig. 1. It consists of a pair of side plates 30, between which is journalled a pair of drums 31 and 32. The tire 33 of the wheel C to be tested rests on the drums 31 and 32, and as these drums are rotated in the same direction, rotary motion will be transmitted to the wheel. Such rotary motion is transmitted through the brake testing lever A, the shaft 13 and the ratchet gear 12 through the following mechanism:

Secured to the shaft 13 is a gear pinion 34. Extending between the side plates 30 are a pair of shafts 35, and 36, and secured on each shaft are gears, such as indicated at 35a and 36a. These gears mesh with the gear 34, and they also mesh with gears 31a and 32a, which are connected with the drums 31 and 32. Hence, if shaft 13 is rotated in the direction of the arrow, see Fig. 1, gears 35a and 36a will rotate in the direction of the arrows, and so will the gears 31a and 32a, and the drums 31 and 32. That is, the drums 31 and 32 will rotate in the same direction, and as the tire of the wheel rests on the drums, the wheel will rotate in the direction indicated by the arrow a.

Shaft 13, as previously stated, is rotated by means of the brake testing lever, as the pawl 9 thereof will engage the teeth 14 of the ratchet gear 12 when it is applied, and if the brakes have been applied, the resistance exerted by the brake will be indicated on the gauge dial 25.

As far as the principle of operation and general construction is concerned, the mechanism here illustrated is substantially identical to that illustrated in the co-pending application already referred to. The only new features disclosed in this application are the ratchet gear 12, the hook-shaped extensions 7 on the lower end of the brake testing lever, and the pawl 9 cooperating therewith. These structural features are important, as they provide a means whereby the brake testing means may be quickly applied or removed with relation to the shafts 13 of each truck.

When testing and adjusting the brakes, it is necessary for the operator to first turn one wheel and then another, and to gradually adjust the brakes so that all wheels will rotate with the same amount of resistance. It is accordingly obvious that the brake testing lever is often connected and disconnected with the driving shafts of the respective trucks, and it is accordingly important that it can be quickly attached or removed. Such attachment and removal is readily accomplished with the type of structure here shown, and a considerable time saving results.

Furthermore, by using a ratchet gear having squared teeth, as illustrated, it is possible to reverse the brake testing lever and as such, to transmit rotary motion to the automobile wheels both ahead and reverse, thus testing the brakes both for ahead and reverse movement.

While certain features of the present invention are more or less specifically described, I wish it understood that various changes may be resorted to within the scope of the appended claim, similarly that the materials and finishes of the several parts employed may be such as the manufacturer may decide, or varying conditions or uses may demand.

Having thus described my invention, what I claim and desire to secure by Letters Patent is:—

In a brake testing device of the character described, a rigid lever, a pair of interspaced hook-shaped members on the lever and at one end thereof, a ratchet gear having a hub member on each side thereof with which the hook-shaped members are adapted to engage, a spring actuated pawl pivotally mounted on the lever and engageable with the teeth of the ratchet gear, an operating lever pivotally mounted on the rigid lever at a point intermediate the ends of the rigid lever, and springs interposed between the two levers and resisting movement of the operating lever with relation to the rigid lever when the operating lever is moved in one direction, said pivoted pawl being so formed as to ride over the teeth of the ratchet gear when the operating lever is moved in the opposite direction.

WILLIS H. WATROUS.